July 23, 1957 F. A. MULLER 2,800,210
ELECTRO-MECHANICAL CLUTCH-BRAKE
Filed May 9, 1952
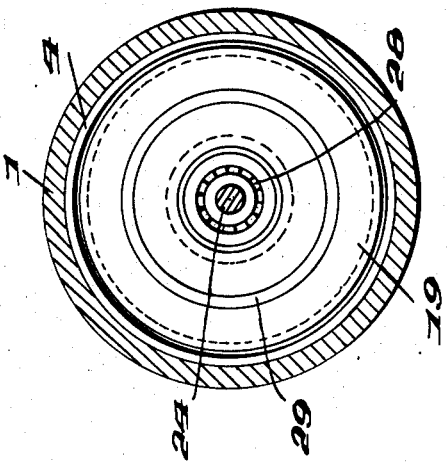
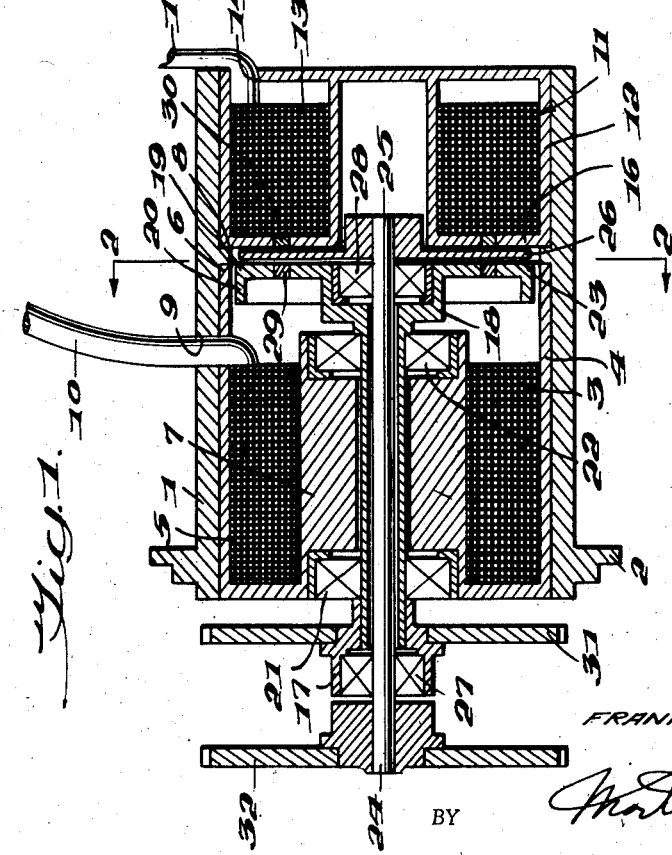
INVENTOR
FRANK A. MULLER,
BY
ATTORNEY

United States Patent Office 2,800,210
Patented July 23, 1957

2,800,210

ELECTRO-MECHANICAL CLUTCH-BRAKE

Frank A. Muller, Glen Arm, Md., assignor to The Glenn L. Martin Company, Middle River, Md., a corporation of Maryland Application May 9, 1952, Serial No. 286,857

9 Claims. (Cl. 192—18)

This invention relates generally to motion transmitting devices and more particularly to a friction type electro-mechanical clutch-brake adapted for use in electro-mechanical computers and the like for transmitting shaft rotations where very rapid clutching and braking action is required.

In computers of the type described in the assignees copending application bearing Serial No. 227,948, where shaft rotations operate to provide the computer solution, fast and positive action of the clutch-brake units is necessary for accuracy. Also, it is most desirable if not essential that the size of the clutch-brake unit be small so that the complete computer assembly will not be excessively bulky and heavy. Still another very important feature is that the clutch-brake unit be adaptable to an installation which will permit ready access thereto for repairs or removal without requiring disassembling the computer.

By virtue of the structural arrangement of the clutch-brake unit of this invention as hereinafter described, clutching or braking may be fully accomplished within 10 milliseconds to control the rotation of the computer shafts, and the unit may be mounted externally on the computer chassis for easy access.

An object of this invention is to provide a fast acting magnetically actuated friction type clutch-brake unit for accurately controlling shaft rotations.

Another object of this invention is to provide a magnetically actuated clutch-brake unit having its input and output shafts at the same end of the housing whereby the unit may be mounted externally for easy access.

Still another object of this invention is to provide a clutch-brake unit of small, compact construction especially adapted for use in electro-mechanical devices such as computers.

Further and other objects will become apparent from the accompanying description and drawings which form a part of this disclosure and in which like numerals refer to like parts.

In the drawing:

Fig. 1 is a fragmentary sectional side view of the magnetic clutch-brake of this invention.

Fig. 2 is a sectional view of the magnetic clutch-brake taken on line 2—2 of Fig. 1.

The clutch-brake unit shown in Fig. 1 includes a generally tubular housing 1 of non-magnetic material having a mounting flange 2 formed at its forward end to provide means for securing the unit to other structure. An annular shaped clutch assembly 3 is rigidly carried within housing 1 adjacent the forward end thereof. Clutch assembly 3 includes a hollow core 4 having one end open for receiving an annular shaped coil 5 within the hollow portion so as to be supported by the core. Core 4 serves as a magnetic field conductor. The outer wall 6 of hollow core 4 extends rearwardly beyond the inner core wall 7 so as to butt against a circumferential projection 8 formed in housing 1. Projection 8 isolates the flux paths of the clutch and brake assemblies as hereinafter described. An opening 9 formed in outer core wall 6 and housing 1 is adapted to admit an electrical lead 10 which connects with clutch coil 5.

An annular shaped brake assembly 11 is rigidly carried within housing 1 adjacent its rearwardmost end and is spaced from the clutch assembly by projection 8. Brake assembly 11 includes a hollow core 12 and an annular shaped coil 13 wherein the coil is carried within the hollow portion of core 12. Brake core 12, like clutch core 4 serves as a magnetic field conductor. An opening 14 is formed in the rearward end of core 12 to admit an electrical lead 15 inside the hollow core for connecting with coil 13. The generally flat forward wall 16 of brake assembly core 12 butts against projection 8 and lies in a plane transversely of the axis of housing 1 to provide a frictional braking surface as hereinafter described.

A hollow driving shaft 17 of magnetic material extends axially into housing 1 and through the central opening formed by the annular shaped clutch assembly 3. The diameter of hollow shaft 17 is such that its outer surface will lie closely adjacent the inner wall 7 of clutch core 4 so that the magnetic flux generated by clutch coil 5 will readily bridge the small air gap therebetween. Thus shaft 17 actually forms a part of the clutch core. The inner or rearwardmost end 18 of hollow shaft 17 is flared radially outwardly to form a generally circular driving disc 19 as shown in Fig. 2. Driving disc 19 is generally flat and lies in a plane generally parallel with the forward wall 16 of brake core 12 and transversely of the axis of housing 1. The peripheral portion of disc 19 is formed as a forwardly extending flange 20 to provide a relatively large surface area parallel with outer wall 6 of clutch core 4 and closely adjacent thereto so that the magnetic flux generated by clutch coil 5 will readily bridge the small air gap and pass into driving disc 19. Shaft 17 and its associated disc 19 are mounted for rotational movement only by suitable bearings 21 and 22 supported by housing 1 through clutch core 4. The length of shaft 17 extending within housing 1 is such that the rearward face 23 of disc 19 is substantially coplanar with the rearwardmost end of outer wall 6 of clutch core 4.

An output shaft 24 is telescopically received within hollow shaft 17 and extends beyond each end thereof. The rearward end 25 of shaft 24 rigidly carries a flat, generally circular disc 26 which lies between and is generally parallel with disc 19 and the forward wall 16 of brake core 12. Shaft 24 and disc 26 are carried for both rotational and limited axial movement relative to hollow shaft 17 through bearings 27 and 28 mounted in the ends of hollow shaft 17 so as to permit disc 26 to move into frictional engagement with either disc 19 or brake core wall 16. The spacing between disc 19 and brake core wall 16 is only slightly greater than the thickness of disc 26, say .005 of an inch, so that frictional engagement with either member may be made with only slight axial movement of shaft 24.

Driving disc 19 includes a ring 29 of non-magnetic material forming a non-magnetic annular portion between shaft 17 and flange 20 which diverts the flux produced by energizing clutch coil 5 from disc 19, across the narrow air gap between disc 19 and disc 26, into disc 26 and then back into disc 19 at the other side of the ring. This provides a continuous magnetic flux path around the clutch coil which passes through disc 26, producing a relatively strong force tending to draw disc 26 into face-to-face contact with disc 19 whereby any motion of shaft 17 will be frictionally transmitted to output shaft 24.

Forward wall 16 of brake assembly core 12, like disc 19, includes a ring 30 of non-magnetic material forming a non-magnetic annular portion which causes the magnetic flux produced by energizing brake coil 13 to pass through disc 26 in order to make a continuous path around the brake coil. This provides a relatively strong force tending to draw disc 26 into face-to-face contact with wall 16 and free of disc 26 whereby output shaft 24 is held against rotation regardless of the rotation of shaft 17.

A gear 31 is secured to the forward end of the input or hollow shaft 17 exteriorly of housing 1 for causing rotational movement of the hollow shaft. The rotation of the output or driven shaft 24, controlled by the clutch-brake unit itself, is transmitted from the clutch-brake through gear 32 secured to shaft 24 forwardly of gear 31 on the same end of the housing. Both the driving and driven gears 31 and 32 being carried at the same end of the clutch brake unit, permits mounting the unit exteriorly for easy access.

Since the magnetic flux will follow the path of least resistance, the space relationship of the components within the clutch-brake unit is most important. The air gaps between shaft 17 and inner core wall 7, and between flange 20 and outer core wall 6 must be sufficiently less than the spacing provided by projection 8 between the brake and clutch cores to cause the magnetic flux to take a path through disc 19 rather than through the core of the assembly not energized. Also, the non-magnetic rings 29 and 30 must have sufficient radial thickness as compared with the air gap between disc 26 and disc 19 or brake core wall 16 to cause the magnetic flux to pass through disc 26 in making a continuous circuit around the energized coil.

In the operation of the clutch-brake unit described hereinabove, clutching and braking action is obtained by selectively energizing the clutch and brake assembly coils. Energizing clutch coil 5 causes disc 26 to move into frictional contact with disc 19, preventing relative movement therebetween so that any rotation of the hollow input shaft 17 is transmitted to output shaft 24. Energizing brake coil 13 causes disc 26 to move into frictional contact with forward wall 16 of brake core 12, which is fixed, so that output shaft 24 is prevented from rotating regardless of the rotation of input shaft 17. Thus, rotation of the input shaft may be transmitted to the output shaft as desired by simply controlling the energization of the clutch and brake coils.

The mechanical arrangement of the clutch-brake not only provides rapid and positive action in transmitting controlled shaft rotations but also it is adaptable to very small and light-weight units such as are required for use in computers and other components of aircraft guidance systems.

It is to be understood that certain changes, alterations, modifications and substitutions can be made without departing from the spirit and scope of the appended claims.

I claim as my invention:

1. An electro-mechanical clutch-brake comprising, a generally tubular housing of non-magnetic material, an annular shaped brake coil and core assembly fixedly carried within said housing adjacent one end thereof for generating a magnetic field through said core when said coil is energized by an electric current, an annular shaped clutch coil and core assembly carried within said housing adjacent the opposite end thereof, and spaced from said brake coil and core assembly, said clutch coil generating a magnetic field through said clutch core when energized, said clutch core having a fixed portion with inner and outer walls supporting said clutch coil therebetween, and a movable portion, said movable portion including a hollow shaft extending axially into said housing and closely adjacent the inner wall of said clutch core fixed portion and terminating in a clutch disc, the outer edge of which lies closely adjacent the outer wall of said clutch core fixed portion between said clutch coil and said brake assembly, bearing means carried by said clutch core fixed portion allowing only rotational movement of said hollow shaft, a second shaft telescopically received within said hollow shaft and extending therethrough, bearing means carried by said hollow shaft allowing free rotational and limited axial movement of said second shaft, a second shaft disc secured to said second shaft between said clutch disc and said brake core and adapted to make frictional contact with either said clutch disc or said brake core upon axial movement of said second shaft, and a ring of non-magnetic material carried by each said hollow disc and said brake core for causing the magnetic flux therein to be diverted into said second shaft disc in making a continuous flux path around the energized coil whereby said second shaft disc is drawn against said hollow shaft disc or said brake core and held against rotation relative thereto.

2. A friction type electro-mechanical clutch-brake comprising, a generally tubular housing of non-magnetic material, an annular shaped clutch coil and core assembly carried within and affixed to said housing adjacent one end thereof, said clutch coil when energized providing a magnetic field through said clutch core, a brake coil and core assembly fixedly carried within said housing adjacent the opposite end thereof and spaced from said clutch coil and core assembly, said brake coil when energized providing a magnetic field through said brake core, a hollow input shaft extending axially into said housing and through said annular shaped clutch assembly closely adjacent said clutch core and terminating adjacent said brake assembly, a magnetic field conducting driving disc fixedly carried by said hollow shaft and having its outer edge lying closely adjacent said clutch core to provide a flux path for said magnetic field through said driving disc, bearing means for supporting said hollow shaft and driving disc and allowing only rotational movement thereof, an output shaft telescopically received within said hollow shaft and extending therethrough, a disc fixedly secured to said output shaft between said driving disc and said brake assembly, bearing means carried by said hollow shaft for supporting said output shaft and allowing free axial and rotational movement thereof relative to said hollow shaft whereby said output shaft disc may selectively move into contact with said driving disc or said brake core, a ring of non-magnetic material carried by each said driving disc and said brake core to cause the flux path to pass through said output shaft disc when energizing either of said coils for selectively drawing said output shaft disc into contact with said driving disc or said brake core and maintaining a fixed postion relative thereto, and means for transmitting motion to said input shaft and from said output shaft.

3. A friction type electro-mechanical clutch-brake comprising, a generally tubular housing, an annular shaped clutch coil and core assembly carried within and affixed to said housing adjacent one end thereof, a brake coil and core assembly fixedly carried within said housing adjacent the opposite end thereof, a circumferential projection of non-magnetic material formed on the inner surface of said housing separating said clutch and brake assemblies, said coils generating a magnetic field for magnetizing their respective cores when energized, an input shaft extending axially into said housing, a driving disc fixedly carried by said input shaft between said clutch and brake assemblies, said driving disc being magnetized through said clutch core when energizing said clutch coil, bearing means carried by said housing for supporting said input shaft and driving disc and allowing only rotational movement thereof, an output shaft extending axially into said housing in coaxial relation with said input shaft, a driven disc fixedly carried by said output shaft between said driving disc and said brake core, bearing means supporting said output shaft and driven disc and allowing both axial and rotational movement thereof whereby said driven disc may selectively move into frictional contact with said driving disc or said brake core, a ring of non-magnetic material carried by each said driving disc and said brake core to cause the magnetic flux path to pass through said driven disc when energizing either of said coils for selectively drawing said driven disc into contact with said driving disc or said brake core and maintaining a fixed position relative thereto, and means for transmitting motion to said input shaft and from said output shaft.

4. A friction type electro-mechanical clutch-brake comprising, a generally tubular housing, a brake coil and core assembly fixedly carried within said housing adjacent one end thereof and adapted to generate a magnetic field circuit through said core when said coil is energized by an electric current, an annular shaped clutch coil and core assembly carried within said housing adjacent the opposite end thereof and adapted to generate a magnetic field circuit through said clutch core when said clutch coil is energized by an electric current, said clutch core having a fixed portion with inner and outer walls supporting said clutch coil therebetween, and a movable portion, said movable portion including an input shaft extending axially into said housing and closely adjacent the inner wall of said clutch core fixed portion and terminating in a flared section shaped as a disc, the outer edge of which lies closely adjacent the outer wall of said clutch core fixed portion between said clutch coil and said brake assembly, bearing means carried by said housing and allowing only rotational movement of said input shaft and disc, a second shaft extending axially into said housing in coaxial telescopic relation with said input shaft, a disc secured to said second shaft between said input shaft disc and said brake core, bearing means supporting said second shaft and disc and allowing both axial and rotational movement thereof whereby said second shaft disc may selectively move into frictional contact with either said input shaft disc or said brake core, a ring of non-magnetic material carried by each said input shaft disc and said brake core for causing the magnetic flux path to pass through said second shaft disc when energizing either of said clutch or brake coils whereby to selectively draw said second shaft disc into contact with said input shaft disc or said brake core for maintaining a fixed position relative thereto, and means for transmitting motion to said input shaft and from said second shaft.

5. A magnetic clutch-brake assembly comprising a housing of non-magnetic material, a magnetic brake device affixed in said housing coaxially therewith, an electromagnetic clutch device positioned within said housing coaxially with said brake device and spaced slightly therefrom, said clutch device including an electromagnetic coil fixed with respect to said housing, and magnetic circuit means encompassing the coil at least at the central, outer end and peripheral portions thereof, said magnetic circuit means comprising alto a rotary clutch element rotatable with respect to said coil and disposed at least in part so as to constitute the innermost end of said clutch device, an input shaft arranged to drive said clutch element in a rotary fashion from a source of power, a rotary magnetic element disposed in the space between said devices and closely adjacent the driving surface of said clutch element and a frictional braking surface of said braking device, and a power output shaft disposed in coaxial telescopic relation with said input shaft and connected to and rotatable with said rotary magnetic element, said brake device and said clutch device, when selectively energized, causing said power output shaft to move axially either so as to bring said rotary magnetic element into engagement with said frictional braking surface, or into engagement with said clutch element, respectively.

6. An electro-mechanical clutch-brake comprising a housing, an annular shaped clutch coil and core assembly in said housing, coaxial, telescopically disposed input and output shafts rotatably mounted with respect to said core, and with the output shaft being mounted for limited axial movement with respect to said input shaft, a brake coil in said housing, spaced from said clutch coil, and having a frictional braking surface thereon, a driving disc mounted on said input shaft, located in the space between said clutch and brake coils, a driven disc mounted on said output shaft intermediate said driving disc and said frictional braking surface, said coils being adapted to be selectively energized, said clutch coil, when energized, establishing a magnetic field in said clutch core to cause said driven disc to move axially into engagement with said driving disc so as to receive rotation therefrom, said brake coil, when energized, establishing a magnetic field to cause said driven disc to move axially into engagement with said frictional braking surface, to arrest the rotation of said output shaft.

7. The clutch-brake as defined in claim 6 in which said output shaft, when neither coil is energized, is freely rotatable.

8. An electro-mechanical clutch-brake as defined in claim 6 in which the inner shaft of the coaxial shaft arrangement is supported adjacent its ends by bearings mounted adjacent the ends of the outer shaft, the outer shaft being mounted in bearings located in said clutch core, said shafts and said clutch core being removable as a unit from said housing.

9. An electro-mechanical clutch-brake comprising a housing, a clutch coil assembly and a brake coil assembly disposed in spaced relation in said housing, and a pair of shafts rotatably mounted in said housing and supported by said clutch coil assembly, said shafts being disposed in coaxial relation with one of said shafts being the input shaft and the other the output shaft, the input and output connections of said input and output shafts, respectively, being located on the same end of said clutch coil, adjacent one end of said housing, driving means and driven means inside said housing, mounted upon said input and output shafts, respectively, and located in the space between said coil assemblies, said output shaft being mounted for limited axial movement with respect to said input shaft so that said driven means can be brought into engagement with said driving means, or into engagement with a surface on said brake coil assembly, said clutch coil and brake coil being capable of being selectively energized, said clutch coil, when energized, causing said output shaft to move axially to bring said driven means into engagement with said driving means of said input shaft so as to receive motion therefrom, said brake coil when energized, causing said output shaft to move axially in the opposite direction so as to bring said driven means into frictional engagement with said brake surface, said clutch coil assembly and said shafts being removable from said housing as a unit without disturbing the mounted position of said housing.

References Cited in the file of this patent

UNITED STATES PATENTS

| 1,334,759 | Huebner | Mar. 23, 1920 |
| 2,065,820 | Mellon | Dec. 29, 1936 |
| 2,401,003 | Lear | May 28, 1946 |
| 2,560,868 | Hubert | July 17, 1951 |
| 2,605,877 | Winther | Aug. 5, 1952 |
| 2,612,248 | Feiertag | Sept. 30, 1952 |

FOREIGN PATENTS

| 920,756 | France | Apr. 17, 1947 |